United States Patent
Spuller et al.

(10) Patent No.: US 10,800,082 B2
(45) Date of Patent: Oct. 13, 2020

(54) HOT RUNNER INJECTION NOZZLE AND DRIVE TRAIN

(71) Applicant: OTTO MÄNNER GMBH, Bahlingen a.K. (DE)

(72) Inventors: Swen Spuller, Forchheim (DE); Marius Bär, Eichstetten (DE)

(73) Assignee: OTTO MÄNNER GMBH, Bahlingen a. K. (DE)

( * ) Notice: Subject to any disclaimer, the term of this patent is extended or adjusted under 35 U.S.C. 154(b) by 240 days.

(21) Appl. No.: 16/103,570

(22) Filed: Aug. 14, 2018

(65) Prior Publication Data
US 2020/0055221 A1   Feb. 20, 2020

(51) Int. Cl.
*B29C 45/28*     (2006.01)
*B29C 45/27*     (2006.01)

(52) U.S. Cl.
CPC ........ *B29C 45/281* (2013.01); *B29C 45/2735* (2013.01); *B29C 45/2806* (2013.01); *B29C 2045/2813* (2013.01); *B29C 2045/2831* (2013.01); *B29C 2045/2858* (2013.01)

(58) Field of Classification Search
CPC .......... B29C 45/281; B29C 2045/2831; B29C 45/2735; B29C 45/2806; B29C 2045/2813; B29C 2045/2858
See application file for complete search history.

(56) References Cited

U.S. PATENT DOCUMENTS

| | | | |
|---|---|---|---|
| 2004/0009259 A1* | 1/2004 | Manner | B29C 45/2806 425/564 |
| 2006/0233911 A1 | 10/2006 | Spuller | |
| 2008/0152752 A1 | 6/2008 | Klobucar et al. | |
| 2018/0236531 A1* | 8/2018 | Spuller | B29C 45/2737 |

FOREIGN PATENT DOCUMENTS

WO   WO 2015/150501 A1   10/2015

* cited by examiner

*Primary Examiner* — Joseph S Del Sole
*Assistant Examiner* — Jerzi H Moreno Hernandez
(74) *Attorney, Agent, or Firm* — Pauley Erickson & Swanson

(57) ABSTRACT

An injection nozzle for an injection molding device comprising a nozzle head, an actuator, a drive train connected to the actuator, and at least one closure element. The drive train configured for moving the at least one closure element arranged in the nozzle head in a first direction. The drive train comprising a cam mechanism that comprises a cam head. The cam head comprising a cam head block. Per closure element, the cam head block comprising a bracket. The bracket comprising at least one inlay. Per closure element, the at least one inlay comprising a first drive surface configured for engaging and driving a second drive surface arranged at the closure element at least during closing of the closure element. Per closure element, the cam head block comprising a third drive surface configured f engaging and driving a fourth drive surface arranged at the closure element at least during opening of the closure element.

21 Claims, 3 Drawing Sheets

HOT RUNNER INJECTION NOZZLE AND DRIVE TRAIN

BACKGROUND OF THE INVENTION

Field of the Invention

The present invention relates to a hot runner injection nozzle comprising a drive train to actuate a closure element by an actuator.

Discussion of Related Art

Hot runner nozzles comprising drive trains to actuate closure elements (valve pins) are known from the prior art. Several thereto related publications are briefly cited hereinafter.

WO15150501A1 was first published in October 2015 in the name of the same applicant as the herein disclosed invention. It is directed to a hot runner nozzle for side gating in a hot runner injection molding apparatus. A nozzle that is connectable to a melt outlet opening of a hot runner manifold. It comprises a nozzle flange portion, a nozzle body portion and a nozzle bridge portion. The nozzle bridge portion has at least two adjacently arranged nozzle tip sections. At least two valve pins are coupled to a valve pin actuating device which is moveable back and forth along a first axis. The at least two valve pins are moveable along a second axis which is arranged at an angle to the first axis. The nozzle tip sections are connected adjacent to the nozzle body portion and separated by a nozzle bridge separator, which is designed to accommodate movements of the nozzle tip sections.

US2008152752A was first published in June 2008 in the name of Mold Masters Ltd. It is directed to an injection molding apparatus which includes an injection manifold having an inlet and a melt channel. The manifold melt channel branches to a plurality of melt channel outlets. A hot runner injection nozzle includes an axial melt channel extending along a central axis and communicating with one of the manifold melt channel outlets. The nozzle further includes at least two angled melt channels dis-posed at an angle to the central axis. At least two nozzle tips are provided, and each includes a nozzle tip melt channel in communication with one of the angled melt channels. A valve pin is disposed at least partially within the axial melt channel coaxially with the central axis and movable within the axial melt channel. Lateral valve pins, movable within the nozzle tip melt channels, are disposed at an angle to the valve pin. Linkage elements continuously connect the lateral valve pins to the valve pin. Axial movement of the valve pin is transmitted through the linkage elements to the lateral valve pins to open and close communication between the nozzle tip melt channels and the lateral mold gates.

US2006233911A was first published in October 2008 in the name of the same applicant as the herein disclosed invention. US'911 is directed to an injection molding nozzle with a nozzle head including at least one discharge opening. A closure element for closing the discharge opening is movably supported in the nozzle head in order to control the supply of melt material to a communication opening in an injection mold. The closure element is operable by a drive mechanism provided with a short stroke actuating means for displacing the closure element in a direction opposite to the closing direction of the closure element by a predetermined short distance so as to automatically retract the closure element by the predetermined short distance when it is no longer biased by the actuating means in the closing direction.

SUMMARY OF THE INVENTION

One aspect of the invention is directed to a hot runner injection nozzle comprising an improved drive train, which interconnects an actuator and at least one thereto-related closure element, which is arranged in a nozzle head of the injection nozzle at an angle or parallel with respect to the actuator. Such injection nozzles may be used for hot runner injection molding devices, such as injection molds and injection molding systems.

Injection nozzles for a hot runner injection molding device normally comprise at least one closure element which is interconnected to an actuator and a thereto interconnected closure element by a drive train, which allows to displace the closure element linearly in a first direction. While the closure element is arranged inside the injection molding device next to a thereto related valve gate opening and during operation interacts with the valve gate opening, the actuator is arranged further apart. More and more popular become injection nozzles wherein the closure element is arranged at an angle (perpendicular) with respect to the actuator. This often occurs in situations where a multiplicity of small parts needs to be molded which in addition are arranged relatively close to each other in the injection mold. The drive train therefore must fulfill special requirements with respect to size, robustness, temperature resistance and namely durability. Otherwise it cannot be guaranteed that the required specifications are met.

An injection nozzle according to the invention normally comprises an actuator inter-connected via a drive train to at least one closure element arranged movable in a nozzle head in a first direction. The drive train comprises a cam mechanism with a cam head with a cam head block. The cam head block normally comprises per closure element a bracket which is foreseen to receive at least one inlay. The inlay is primarily foreseen to improve the wear behavior of the injection nozzle especially under harsh conditions as it protects the cam head block from direct contact at least in one direction of movement. The at least one inlay is preferably made from at least one material out of the following group of materials or a combination thereof: tungsten carbide or ceramic.

The cam head comprising the cam head block and the at least one inlay is arranged moveable in a second direction. Normally the second direction is arranged at an angle of 90° with respect to the first direction (moving direction of closure elements). Per closure element the at least one inlay provides a first drive surface which interacts with a thereto assigned second drive surface arranged at a rear end of the closure element. The interaction takes place at least during closing of the closure element, i.e. pushing the closure element in a radial outward direction. If appropriate alternatively or in addition an inlay can be arranged at the rear end of the closure element the second drive surface. Per closure element the cam head block may comprise a third drive surface which may interact with a fourth drive surface arranged at the closure element at least during opening of the closure element, i.e. pulling the closure element in a radial inward direction. Normally the first and the second moving direction are arranged at an angle of 90° other arrangements are possible. Depending on the required arrangement of the nozzle gates, the first moving direction of the at least one closure element and the second moving direction of the cam head can be arranged at an angle having a value from 0° (parallel) to 90° (perpendicular).

Depending on the field of application, different arrangements of the brackets, respectively the inlays are possible. E.g. the cam head block may comprise at least one pair of brackets each comprising an inlay, said two brackets being arranged back to back with respect to the first direction. Good results can be achieved, when the cam head block comprises four brackets each comprising an inlay, said brackets being arranged an angle of e.g. 90° with respect to each other in a circumferential direction radially outward with respect to the first direction. Depending on the field of application another number of closure elements is possible.

The first drive surface provided by the at least one inlay extends in a third direction, the third direction being arranged at an angle with respect to the first direction. The being preferably in the range of 15° to 65°.

In a preferred variation, the recess comprises a bottom surface and two thereto adjacent side surfaces arranged opposite to each other with respect to the bottom surface. The recess extends linearly in the third direction. A third drive surface can be arranged at least partially in at least one side surface of the recess, e.g. at a protrusion in the recess. If appropriate the protrusion can be incorporated as an inlay or be a part thereof itself. The inlay can be arranged in a thereto related bracket.

When looking in the direction in which the recess extends the clear dimension of the recess in the cam head block is preferably constant over the length of the recess. I.e. when viewing in the direction of the recess no projection extends into the cross section. In a preferred variation, the recess extends between a side surface and an end surface of the cam head block. Other arrangements are possible. The end surface can have a staggered design with several levels. If appropriate, the recess can follow the contour of the levels in the respective area.

The inlay preferably is a pad, preferably having a rectangular pad shape. Good results can be achieved when it is arranged in the area of the bottom of the recess. Depending on the particular design it can be inserted into the related bracket in depth direction of the recess. In a preferred variation the inlay is inserted in longitudinal direction of the recess. To securely hold the inlay in the recess, the side surfaces of the recess may have protrusions forming undercuts in vertical direction behind which the inlay can be inserted in longitudinal direction. Behind, the pad shaped inlay in depth direction of the recess can be directly supported by the bottom surface of the recess. The inlay can be locked in longitudinal direction of the recess e.g. by a bolt or a welding spot or another appropriate means which avoids movement of the inlay in longitudinal direction. Alternatively or in addition the inlay can be clamped.

The first drive surface of the inlay and the corresponding third drive surface of the cam head block are normally arranged at an angle with respect to the second direction as mentioned above. Good results can be achieved when the angle is in the range of 10° to 30°. Depending on the field of application, other values are possible. Good results are achieved when the third drive surface are arranged at a protrusion of the at least one side surface of the recess, extending parallel to and spaced a distance apart from the first drive surface provided by the inlay. The fourth drive surface can be arranged at a shoulder or in a notch arranged at the closure element. The area of the second drive surface preferably is larger than the sum of the areas of the at least one fourth drive surface. The cam head block and the at least one inlay are interconnected to each other by at least one bolt which is arranged in an opening. The cam head can comprise at least one bearing surface to support the cam head during operation with respect to the closure element housing to avoid unwanted tilting and distortion of the cam head with respect to the housing.

Preferably the second drive surfaces are comparably larger than the respective third and fourth drive surface. Good results can be achieved when the second drive surface arranged at the rear end of the closure element has per closure element between about 1.25 and 3 times the size of the total area (sum) of the fourth drive surfaces as described hereinafter.

The thereto corresponding fourth drive surface is preferably arranged in a notch or at a shoulder arranged at the closure element. The protrusion and the thereto corresponding notch can have a V-shaped cross section resulting in a robust but yet precise interaction. In addition, it can have the positive effect of self-centering when arranged symmetric.

The present invention is also directed to an injection molding device comprising at least one injection nozzle as described herein. Such an injection molding device may be a hot runner injection molding device comprising at least one hot runner injection nozzle as described herein.

It is to be understood that both the foregoing general description and the following detailed description present embodiments, and are intended to provide an overview or framework for understanding the nature and character of the disclosure. The accompanying drawings are included to provide a further understanding, and are incorporated into and constitute a part of this specification. The drawings illustrate various embodiments, and together with the description serve to explain the principles and operation of the concepts disclosed.

BRIEF DESCRIPTION OF SEVERAL VIEWS OF THE DRAWINGS

The herein described invention will be more fully understood from the detailed description given herein below and the accompanying drawings which should not be considered limiting to the invention described in the appended claims. The drawings are showing:

DETAILED DESCRIPTION OF THE INVENTION

Reference will now be made in detail to certain embodiments, examples of which are illustrated in the accompanying drawings, in which some, but not all features are shown. Indeed, embodiments disclosed herein may be embodied in many different forms and should not be construed as limited to the embodiments set forth herein; rather, these embodiments are provided so that this disclosure will satisfy applicable legal requirements. Whenever possible, like reference numbers will be used to refer to like components or parts.

Figure 1:
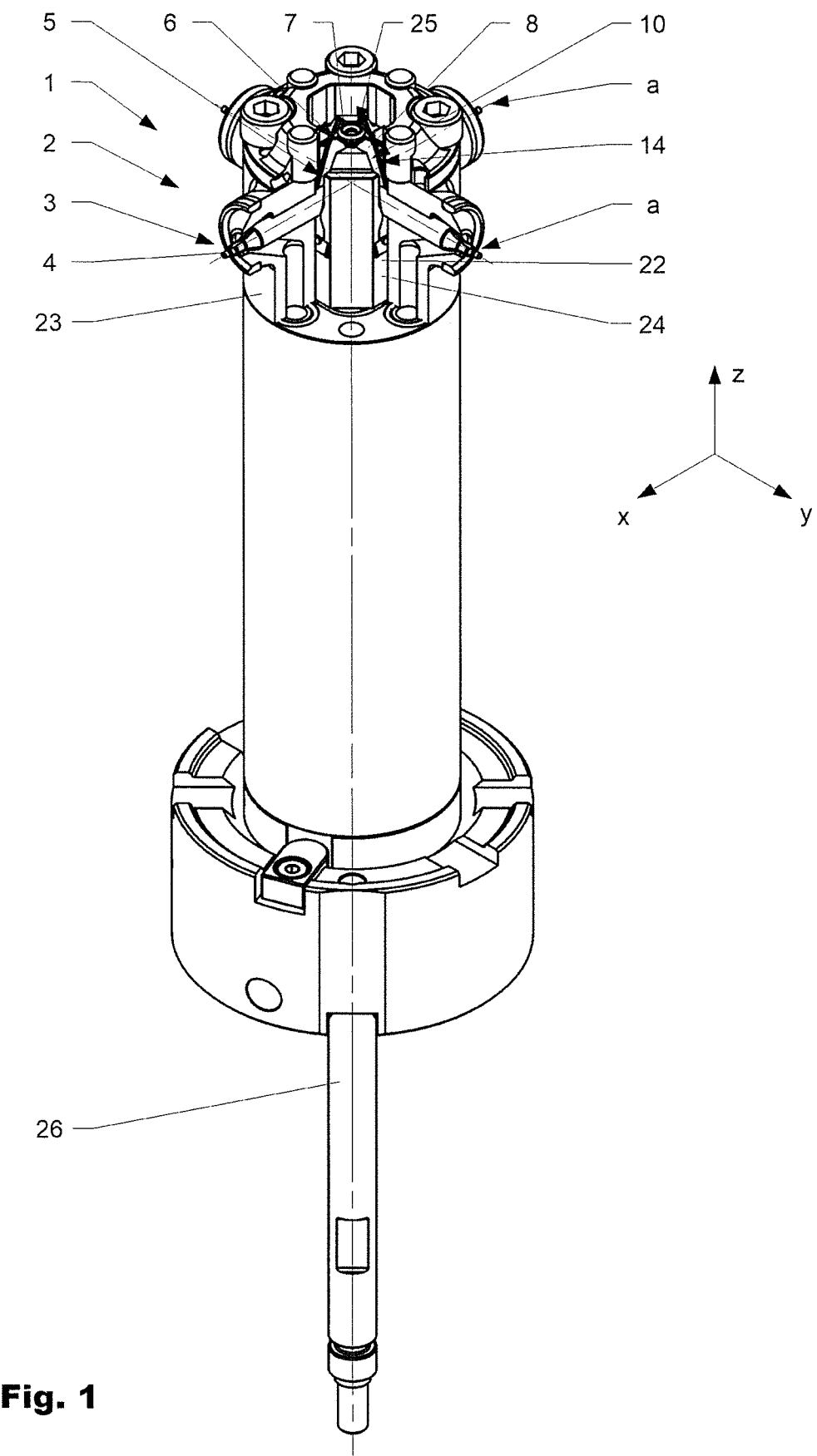
FIG. 1 is a hot runner injection nozzle comprising a drive train in a partially cut view.
Figure 2:
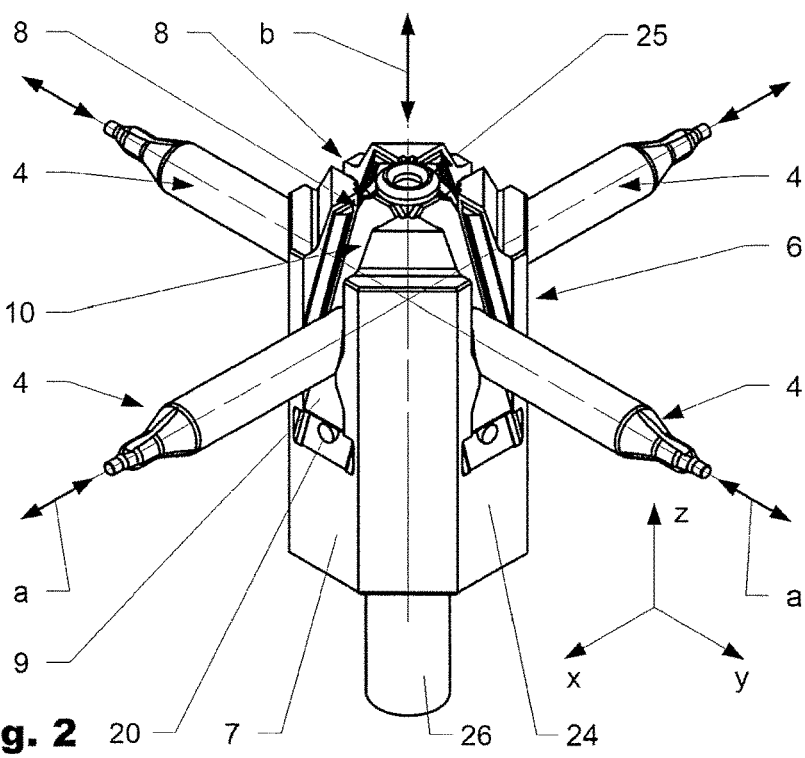
FIG. 2 is the drive train of the injection nozzle according to FIG. 1.
Figure 3:
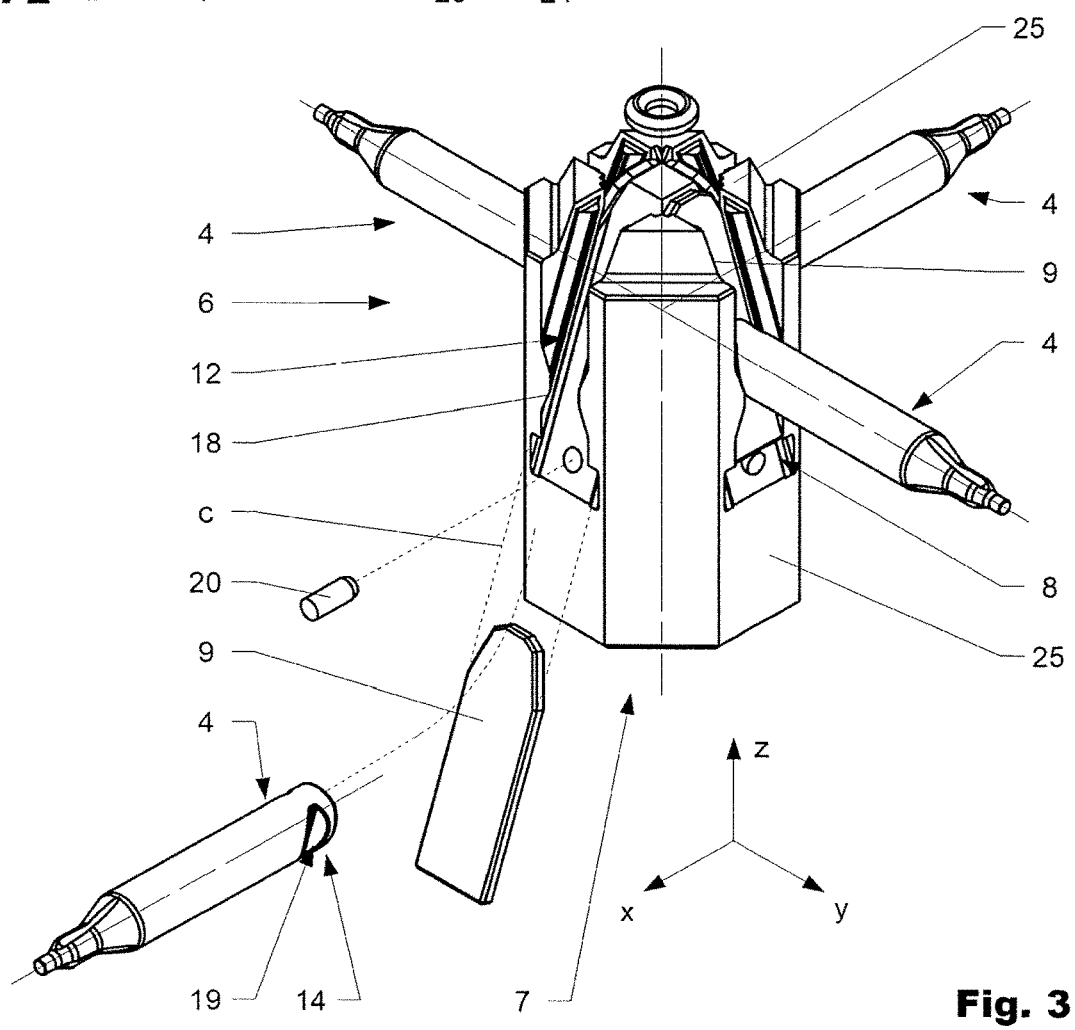
FIG. 3 is the drive train in a partially exploded view.
Figure 4:
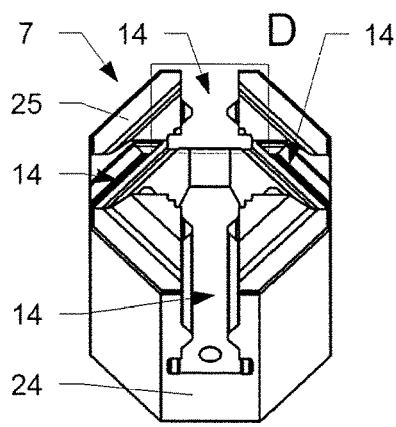
FIG. 4 is the cam head of the drive train according to FIG. 1.
Figure 5:
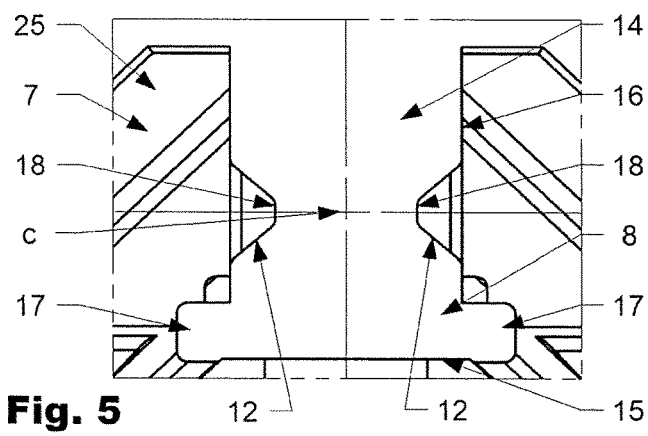
FIG. 5 is detail D according to FIG. 4.
Figure 6:
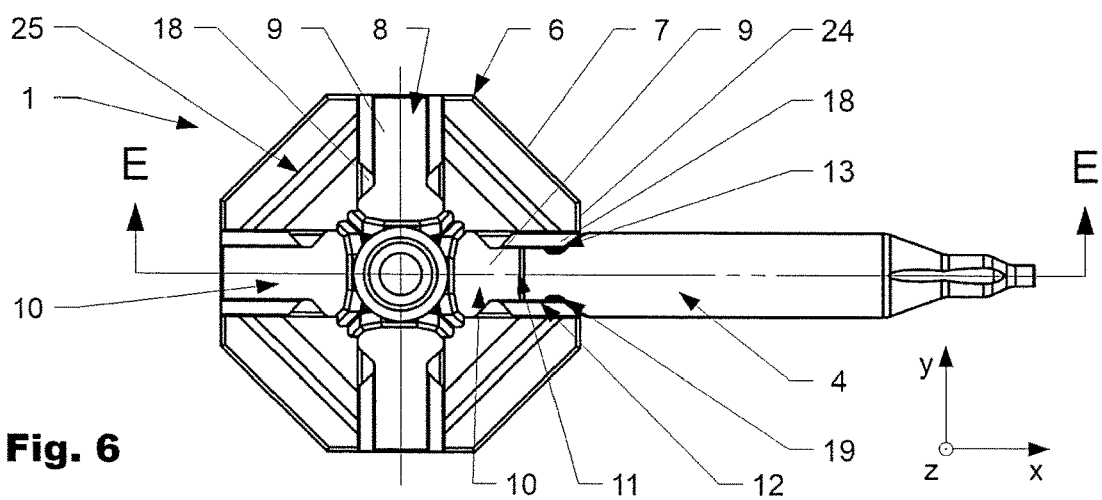
FIG. 6 is the cam head in a top view.
Figure 7:
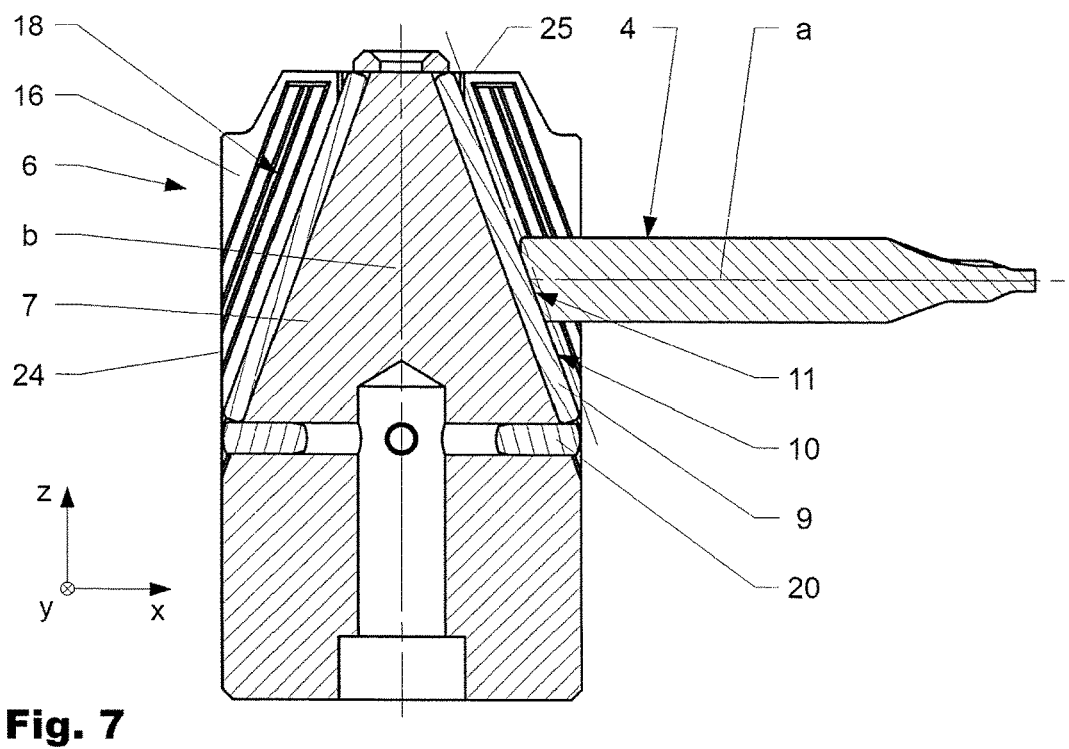
FIG. 7 is the section view according to section line EE of FIG. 6.

FIG. 1 shows an injection nozzle 1 in a perspective view in a partially cut manner. FIG. 2 shows a cam mechanism 5 in a perspective view. FIG. 3 shows the cam mechanism 5 in an exploded manner. FIG. 4 shows a cam head 6 in a perspective view. FIG. 5 is showing detail D according to FIG. 4. FIG. 6 is showing the cam head 6 in a top view and FIG. 7 is showing the cam head 6 in a section view according to section line E-E of FIG. 6.

An injection nozzle 1 for an injection molding device normally comprises an actuator (not shown in detail) interconnected via a drive train 3 to at least one closure element 4 arranged movable in a nozzle head 2 in a first direction a.

In a variation, a drive train 3 of an injection nozzle 1 according to the invention comprises a cam mechanism 5 with a cam head 6. The cam head 6 comprises a cam head block 7 which normally comprises per closure element 4 a bracket 8. The bracket 8 is foreseen to receive at least one inlay 9. The inlay 9 is foreseen to improve the wear behavior of the injection nozzle 1 especially under harsh conditions as it protects the cam head block 7 from direct contact at least in one direction. The at least one inlay 9 is preferably made from at least one material out of the following group of materials: tungsten carbide or ceramic.

The cam head 6 comprising the cam head block 7 and the at least one inlay 9 is arranged moveable in a second direction b. In the shown variation the second direction b is arranged at an angle of 90° with respect to the first direction a (moving direction of closure elements 4).

Per closure element 4 the at least one inlay 9 comprises a first drive surface 10 which interacts with a thereto assigned second drive surface 11 arranged at a rear end of the closure element 4. The interaction takes place at least during closing of the closure element 4, i.e. pushing the closure element 4 in a radial outward direction. If appropriate alternatively or in addition an inlay can be arranged at the rear end of the closure element 4 the second drive surface 11.

Per closure element 4 the cam head block 7 comprises a third drive surface 12 which interacts with a fourth drive surface 13 arranged at the closure element 4 at least during opening of the closure element 4, i.e. pulling the closure element 4 in a radial in-ward direction.

As shown here, the cam head block 7 may comprise at least one pair of brackets 8 each comprising an inlay 9, said two brackets 8 being arranged back to back with respect to the first direction a (here yz-plane or xz-plane).

Although in the shown variation, the first and the second moving direction (a, b) are arranged at an angle of 90° other arrangements are possible. E.g. the first moving direction a of the at least one closure element 4 and the second moving direction b of the cam head 6 can be arranged at an angle $\chi$ having a value from 0° to 90°. Good results can be achieved, when the cam head block 7 as visible in FIG. 1 comprises four brackets 8 each comprising an inlay 9, said brackets 8 being arranged an angle of 90° with respect to each other in a circumferential direction radially outward with respect to the first direction a.

The first drive surface 10 of the inlay 9 extends in a third direction c, the third direction c being arranged at an angle $\alpha$ with respect to the first direction a, said angle $\alpha$ being in the range of 15° to 65°. The recess 14 preferably comprises a bottom surface 15 and two thereto adjacent side surfaces 16 arranged opposite to each other with respect to the bottom surface 15. Good results can be achieved when the recess 14 linearly extends in the third direction c. The third drive surface 12 can be arranged at least partially in at least one side surface 16 of the recess 14, e.g. at a protrusion 18 in the recess 14. If appropriate the protrusion 18 can be incorporated as an inlay or a part thereof itself.

As visible in FIG. 5, which shows detail D of FIG. 4, good results can be achieved when the clear dimension of the recess 14 in the cam head block 7 is constant over the length of the recess 14, i.e. when viewing in the direction c of the recess no projection extends into the cross section.

As visible in FIG. 2, in the shown variation, the recess 14 extends between a side surface 24 and an end surface 25 of the cam head block 7. The end surface 25 can have a staggered design with several levels. The recess 14 can follow the contour of the levels in the respective area.

The inlay 9 preferably is a pad, preferably having a rectangular pad shape. Good results can be achieved when it is arranged at the bottom of the recess 14 as e.g. visible in FIG. 3. In the shown variation, the pad shaped inlay 9 is held in depth direction of the recess 14 by an undercut 17 in the side surface 16. The pad shaped inlay 9 in depth direction of the recess 14 can be directly supported by the bottom surface 15 of the recess 14.

As visible in FIG. 3, the inlay 9 of the shown variation is inserted in longitudinal direction (third direction c) of the recess 14. The inserting of the inlay 9 into the bracket 8 and the interconnection of the notch 19 of the closure element 4 with the protrusions 18 of the cam head block 7 is schematically indicated by dotted lines. To securely hold the inlay in the recess 14, the side surfaces 16 of the recess 14 have protrusions 18 extending in an inward direction forming undercuts 17 in vertical direction of the recess. Behind the undercuts 17 the inlay 9 can be inserted in longitudinal direction of the recess 14. Behind, the pad shaped inlay 9 in depth direction of the recess can be directly supported by the bottom surface 15 of the recess 14. The inlay 9 can be locked in longitudinal direction of the recess e.g. by a bolt or a welding spot or another appropriate means which avoids movement of the inlay in longitudinal direction.

The first drive surface 10 of the inlay 9 and the third drive surface 12 of the cam head block 7 can be arranged at an angle $\alpha$ with respect to the second direction b. Good results can be achieved when the angle $\alpha$ is in the range of 10° to 30°. Depending on the field of application, other values can be used. The third drive surface 12 can be arranged at a protrusion 18 of the at least one side surface 16 of the recess 14, extending parallel to and spaced a distance apart from the first drive surface 10 provided by the inlay 9. The fourth drive surface 13 can be arranged at a shoulder or in a notch 19 arranged at the closure element 4. The area of the second drive surface 11 preferably is larger than the sum of the areas of the at least one fourth drive surface 13. The cam head block 7 and the at least one inlay 9 are interconnected to each other by at least one bolt 20 which is arranged in an opening 21. The cam head 6 comprises at least one bearing surface 22 to support the cam head 6 during operation with respect to the closure element housing 23.

Rather, the words used in the specification are words of description rather than limitation, and it is understood that various changes may be made without departing from the Spirit and scope of the invention.

We claim:

1. An injection nozzle (1) for an injection molding device, comprising:
   a nozzle head (2);
   at least one closure element (4) arranged inside the nozzle head (2);
   an actuator; and
   a drive train (3);

wherein the actuator, the drive train (3), and the at least one closure element (4) are interconnected;

wherein the drive train (3) is configured for moving the at least one closure element (4) in a first direction (a);

wherein the actuator is configured for moving the drive train (3) in a second direction (b);

wherein the drive train (3) comprises a cam mechanism (5) comprising a cam head (6), the cam head (6) including a cam head block (7);

wherein per each closure element (4), the cam head block (7) comprises a bracket (8), the bracket (8) comprising at least one inlay (9);

wherein the actuator is configured for moving the cam head (6) and the at least one inlay (9) together in the second direction (b), wherein per each closure element (4), the at least one inlay (9) includes a first drive surface (10) configured for engaging and driving a second drive surface (11) arranged at the closure element (4) at least during moving of the closure element (4) to a close position; and wherein per each closure element (4), the cam head block (7) comprises a third drive surface (12) configured for engaging and driving a fourth drive surface (13) arranged at the closure element (4) at least during moving of the closure element (4) to an open position.

2. The injection nozzle (1) according to claim 1, wherein the cam head block (7) comprises at least one pair of two brackets (8) each comprising an inlay (9), the brackets (8) arranged back to back with respect to the first direction (a).

3. The injection nozzle (1) according to claim 1, wherein the first moving direction (a) of the at least one closure element (4) and the second moving direction (b) of the cam head (6) are arranged at an angle $\chi$ having a value from 0° to 90°.

4. The injection nozzle (1) according to claim 1, wherein the cam head block (7) comprises four brackets (8) each comprising an inlay (9), the brackets (8) arranged an angle of 90° with respect to each other in a circumferential direction with respect to the first direction (a).

5. The injection nozzle (1) according to claim 1, wherein the first drive surface (10) of the inlay (9) extends in a third direction (c), the third direction (c) arranged at an angle $\alpha$ with respect to the first direction (a), said angle $\alpha$ in the range of 15° to 65°.

6. The injection nozzle (1) according to claim 1, wherein the at least one bracket (8) is arranged in a recess (14) of the cam head block (7), wherein the recess (14) comprises a bottom surface (15) and two side surfaces (16) arranged opposite to each other with respect to the bottom surface (15).

7. The injection nozzle (1) according to claim 6, wherein the recess (14) extends in the third direction (c).

8. The injection nozzle (1) according to claim 7, wherein the third drive surface (12) is arranged in at least one side surface (16) of the recess (14).

9. The injection nozzle (1) according to claim 8, wherein the third drive surface (12) is arranged at a protrusion (18) in the recess (14).

10. The injection nozzle (1) according to claim 1, wherein the recess (14) extends between a side surface (24) and an end surface (25) of the cam head block (7).

11. The injection nozzle (1) according to claim 8, wherein the inlay (9) is pad shaped and arranged at the bottom of the recess (14).

12. The injection nozzle (1) according to claim 11, wherein the pad shaped inlay (9) is held in a depth direction of the recess (14) by an undercut (17) in the side surface (16).

13. The injection nozzle (1) according to claim 12, wherein the pad shaped inlay (9) in the depth direction of the recess (14) is supported by the bottom surface (15) of the recess (14).

14. The injection nozzle (1) according to claim 1, wherein the at least one inlay (9) is made from at least one material out of the following group of materials: tungsten carbide or ceramic.

15. The injection nozzle (1) according to claim 1, wherein the first drive surface (10) of the inlay (9) and the corresponding third drive surface (12) of the cam head bock (7) are arranged at an angle $\beta$ with respect to the second direction (b), wherein the angle $\beta$ is in the range of 10° to 30°.

16. The injection nozzle (1) according to claim 8, wherein the third drive surface (12) is arranged at a protrusion (18) of the at least one side surface (16), and wherein the third drive surface (12) extends parallel to and is spaced a distance apart from the first drive surface (10).

17. The injection nozzle (1) according to claim 1, wherein the fourth drive surface (13) is arranged at a shoulder or in a notch (19) arranged at the closure element (4).

18. The injection nozzle (1) according to claim 1, wherein the area of the second drive surface (11) is larger than the are of the fourth drive surface (13).

19. The injection nozzle (1) according to claim 1, wherein the cam head block (7) and the at least one inlay (9) are interconnected to each other by at least one bolt (20) which is arranged in an opening (21).

20. The injection nozzle (1) according to claim 1, wherein the cam head block (7) comprises at least one bearing surface (22) to support the cam head (6) during operation with respect to a closure element housing (23).

21. An injection molding device comprising at least one injection nozzle (1) according to claim 1.

* * * * *